UNITED STATES PATENT OFFICE.

ALFRED J. M. LASCHÉ, OF MILWAUKEE, WISCONSIN.

PICKLING COMPOUND.

1,194,755.   Specification of Letters Patent.   Patented Aug. 15, 1916.

No Drawing.   Application filed April 3, 1916.   Serial No. 88,427.

*To all whom it may concern:*

Be it known that I, ALFRED J. M. LASCHÉ, a citizen of the United States, and resident of Milwaukee, in the county of Milwaukee and State of Wisconsin, have invented new and useful Improvements in Pickling Compounds, of which the following is a description.

My invention has relation to a new and useful pickling compound or solution.

The object of the invention is to provide an improved compound for the efficient, expeditious and economical curing, souring, pickling and protection of such food products as pickles (including dill pickles) cucumbers, sauer kraut, and the like.

The compound or solution consists of a mixture of brine of approximately forty to seventy degrees saltometer strength, and fermentation lactic acid in a sufficient quantity to provide for the brine containing about one-fourth of one per cent. of absolute lactic acid. The fermentation lactic acid, as is well known, is made from a fermented liquid, as for instance, distillery spent beer, and is prepared from mash after the alcohol has been distilled off by concentrating it and by subsequent distillation. It also contains, but not necessarily, secondary products of fermentation lactic acid and carmalized products. The commercial fermentation lactic acid employed usually contains from about twenty-two to twenty-five per cent. of lactic acid. This fermentation lactic acid is a commercial article obtainable on the market in various degrees of purity. After the two ingredients, viz., the brine and the fermentation lactic acid are mixed, the pickles, or other articles, are submerged therein, and are allowed to remain in this bath for a short length of time before removal therefrom. When desirable, or when circumstances seem to require it, a pure culture of lactic acid bacillus is added in sufficient quantity to result in the production of approximately one-half of one per cent. of lactic acid in the brine. The adding of this ingredient has the effect, after a certain time, of creating a vigorous lactic acid fermentation, during the time the pickles, etc., are being cured and serves not only to create additional souring, but furthermore protects the pickles or other articles against the development of any undesirable bacteria, and hence removes the danger of spoiling the articles while the same are being pickled. It is further to be stated that it may, and frequently is, desirable to add a further quantity of fermentation lactic acid, in order to impart additional souring to the articles. This additional fermentation lactic acid, however, is only utilized whenever the desired results are not obtainable through the medium of the ingredients heretofore mentioned.

What I claim is:

1. A pickling compound, comprising brine and fermentation lactic acid.

2. A pickling compound, comprising brine of approximately forty to seventy degrees saltometer, and fermentation lactic acid, the latter in sufficient quantity to provide for the brine containing about one-fourth of one per cent. of absolute lactic acid.

3. A pickling compound, comprising brine, fermentation lactic acid, and pure culture lactic bacillus.

4. A pickling compound comprising brine, fermentation lactic acid, and pure culture lactic bacillus, the latter being added in sufficient quantity to result in the production of approximately one-half of one per cent. of lactic acid in the brine.

In testimony whereof, I affix my signature.

ALFRED J. M. LASCHÉ.